Nov. 18, 1941.   M. H. FOSSUM   2,263,080
DAMPER REGULATOR SET
Filed Aug. 24, 1939
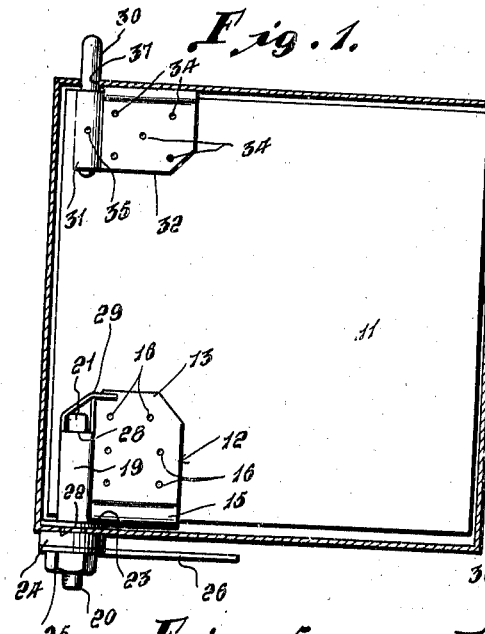
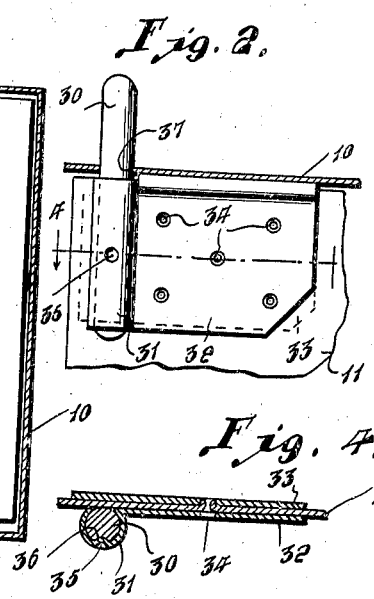
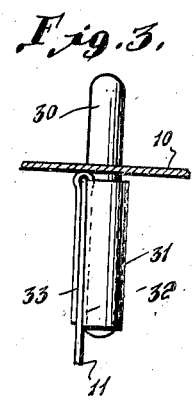
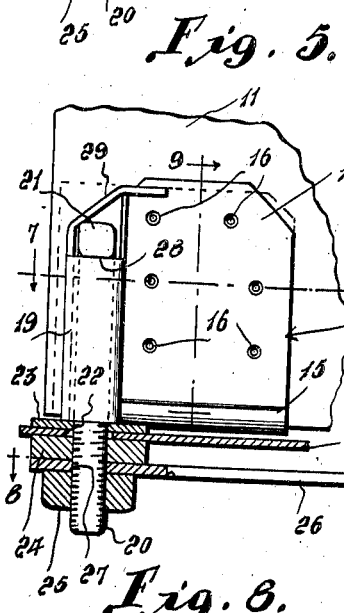
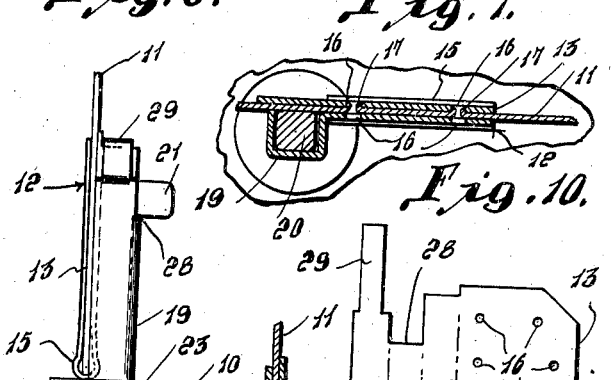
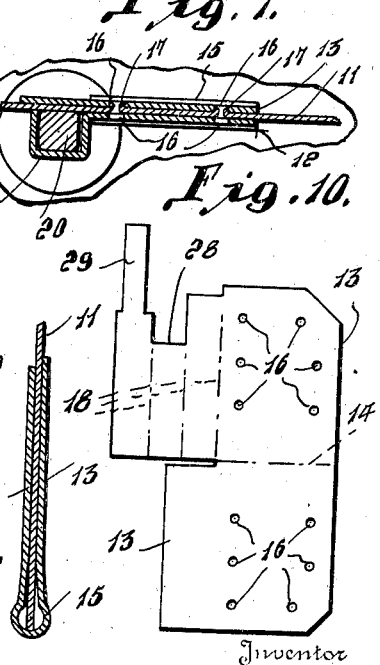
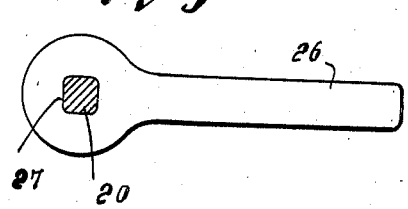
Inventor
M. H. Fossum
By L. F. Randulph
Attorney Patented Nov. 18, 1941

2,263,080

UNITED STATES PATENT OFFICE 2,263,080

DAMPER REGULATOR SET

Maurice H. Fossum, St. Paul, Minn.

Application August 24, 1939, Serial No. 291,795

7 Claims. (Cl. 126—292)

This invention relates to a damper regulator set.

It is particularly aimed to provide a damper regulator means for use in air conditioning ducts particularly adapted for installation either at the factory or at the place of use, which is attachable in a novel manner, particularly by means of a slidable element adapted to fall into an opening in the duct, be fastened in place and have an operating member attached thereto.

It is further aimed to provide in connection with the slidable member, a novel regulator preferably made from a single blank of material.

The more specific objects and advantages will become apparent from a consideration of the description following taken in connection with accompanying drawing illustrating an operative embodiment.

In said drawing:

Figure 1 is a cross sectional view through an air conditioning duct having a damper regulator therein in accordance with the invention;

Figure 2 is an enlarged section on the same plane as Figure 1, particularly showing the upper hinge joint;

Figure 3 is a view of the parts of Figure 2 taken at a right angle thereto;

Figure 4 is a horizontal section taken on the line 4—4 of Figure 2;

Figure 5 is an enlarged section taken on the same plane as Figure 1 but through additional parts of the regulator;

Figure 6 is a section showing the parts of Figure 5 at a right angle thereto;

Figure 7 is a cross sectional view taken on the line 7—7 of Figure 5;

Figure 8 is a section taken on the line 8—8 of Figure 5;

Figure 9 is a vertical section taken on the line 9—9 of Figure 5, and

Figure 10 is a plan view of the blank from which the lower regulator or mounting is made.

Referring specifically to the drawing wherein like reference characters designate like or similar parts, 10 designates a conventional air conditioning duct and 11 represents a damper disposed therein for location at various angles to regulate flow through the duct.

At one lower corner, a regulator or mounting 12, of sheet metal, is provided. This regulator 12, of sheet metal, is provided. This regulator or mounting is made from a single sheet of metal 13 of any desired gage, which is bent into U-shape along the line 14, so as to form a clasp as best shown in Figures 6 and 9, the same being wider apart as at loop 15, at the lower edge than at the free upper edges so as to receive a portion of the damper 11 therebetween, gripping such damper at the upper edge of the mounting 12 but loosely engaging it below such upper edge. The leaves or opposite sides of the mounting 12 have alined openings 16 therethrough so that those portions of the damper 11 in line therewith, may be punctured to form spurs or projections 17 which occupy adjacent openings, and effectively secure the mounting or regulator 12 in place.

It will be noted that one leaf of the regulator or mounting 12 has three parallel fold lines at 18 on which the mounting is adapted to be bent or folded to form a barrel 19, the free edge of which abuts the other leaf of the mounting.

A bolt or shank 20, square in cross section, and having a lateral lug 21 at the top thereof, is adapted to be applied to the barrel 19 by sliding movement or dropping it into the same from the top thereof.

At the lower end, bolt 20 is adapted to pass through an opening 22 in the bottom wall of duct 10, having a washer surrounding it at 23, above such bottom wall, a washer 24 surrounding it below such wall and a nut 25, screw threaded to the bolt below the wall 10, with an operating handle or crank 26, having a square opening 27, receiving the bolt 20, and clamped in place by the nut 25. After positioning of the bolt 20, whose downward movement or application is limited by engagement of lug 21 with a wall or shoulder 28 on the barrel, a strip 29, integral with the regulator or mounting 12 is adapted to be bent over the upper end of the bolt.

At the upper corner of damper 11, in line with the bolt 20, another pivot is provided. This pivot may consist of a pin 30, carried in a barrel 31 on a leaf 32 integral with a leaf 33. Leaves 32 and 33 are in clasped form engaging opposite sides of the damper 11 and held in place by perforating and upsetting the metal of the damper 11 in line with openings 34 through the leaves. Pin 30 is held against displacement as by indenting a portion of barrel 31 at 35, into a recess 36 in the pin 30.

In assembling or attaching the invention to a duct 10, any suitable instrument is used to provide the round opening 22 and a round opening 37, in line therewith, through the bottom and top walls of the duct, respectively. Thereupon, with the member 12 attached to the damper 11 and with the leaves 32 and 33 and pin 30, fully attached, the damper is inserted in a tilted manner so that pin 30 passes up through the opening 37 and the enlarged lower edge or loop 15 will slide on the bottom wall of the duct without undue friction since it is resilient and temporarily deformable through contact with such wall and avoids sharp corners or edges. At the same time, the strip 29 is still straight as in Figure 10 and the bolt 20 is in or is applied to the barrel 19, with its lower end resting on the lower wall of the duct until it registers with the opening 22, whereupon it falls through washer 23 positioned at this time, and said opening to the extent permitted by the engagement of lug 21 with the shoulder 28. Thereupon the strip 29 may be bent over the bolt 20, to prevent retraction, as shown in Figure 5, following which the washer 24, nut 25 and handle 26 are attached. Obviously the latter may be moved to any desired angle to accordingly vary the opening of the damper 11. The loop 15 is of sufficient size as will permit the insertion of a braided or folded over edge of a damper 11 should such a damper require a stiffening edge; likewise the loop 15 is the spring member for the leaves of the mounting which are spaced apart nearest the loop 15 and thence incline toward one another allowing a variable space between the leaves of the mounting for the insertion of dampers of variable thicknesses without any change in the mounting.

I claim as my invention:

1. In a damper construction, a damper, a mounting of U-shape clamped over one edge of the damper, said mounting having openings therethrough so that it may be attached to the damper, a channel on the mounting closed at the rear by the damper to form a barrel, a pivoting and operating bolt slidably mounted in the barrel, a lug on the bolt to overlap the channel member to limit projection of the bolt from the barrel, and a strip integral with the barrel and bendable over the bolt to secure the bolt against retraction from projected position.

2. In a damper construction, a damper, a mounting of U shape clamped over one edge of the damper, the leaves of the mounting being separated to form an enlarged channel receiving the damper edge, said leaves being brought together in closed position at their opposite ends, and a barrel portion carried by one side of the clamp, said barrel portion being closed along one side by said damper, and a bolt secured within said barrel portion.

3. In a damper construction, a damper, a mounting of U shape clamped over one edge of the damper, the leaves of the mounting being separated to form an enlarged channel receiving the damper edge, said leaves being brought together in closed position at their opposite ends, and a barrel portion carried by one side of the clamp, said barrel portion being closed along one side by said damper, and a bolt secured within said barrel portion, and a finger carried by one end of said barrel and overlapping said bolt.

4. In a damper construction, a damper, a mounting of U shape clamped over one edge of the damper, the leaves of the mounting being separated to form an enlarged channel receiving the damper edge, said leaves being brought together to closed position at their opposite ends, and a barrel portion carried by one side of the clamp, said barrel portion being closed along one side by said damper, and a bolt secured within said barrel portion, said barrel portion being closed on one side by the damper, and being closed along one side by one of said leaves.

5. In combination with a damper construction, a bolt mounting consisting of a one piece clamp bent to form two leaves for receiving the damper, said leaves being formed with an enlarged channel at one end to receive the edge of the damper and merging to a closed portion at the other end and being formed along one edge of the leaves at right angles to said channel with a second channel, a bolt within said second channel, said second channel being formed with a finger overlapping said bolt.

6. In combination with a damper construction, a bolt mounting consisting of a one piece clamp bent to form two leaves for receiving the damper, said leaves being formed with an enlarged channel at one end to receive the edge of the damper and merging to a closed position at the other end and being formed along one edge of the leaves at right angles to said channel with a second channel, a bolt within said channel, one of said leaves forming one side of said second channel, and means for permanently securing said clamp to a damper.

7. In combination with a damper construction, the bolt mounting consisting of a one piece clamp to form two leaves, said leaves being formed with an enlarged channel at one end to receive the edge of the damper and merging to a closed portion at the other end, one of said leaves supporting a damper bolt along one edge projecting beyond the mounting, and means for securing said clamp to the damper.

MAURICE H. FOSSUM.